US010596625B2

(12) United States Patent
Unami et al.

(10) Patent No.: US 10,596,625 B2
(45) Date of Patent: Mar. 24, 2020

(54) MIXED POWDER FOR POWDER METALLURGY

(71) Applicant: JFE STEEL CORPORATION, Chiyoda-ku, Tokyo (JP)

(72) Inventors: Shigeru Unami, Tokyo (JP); Juuji Hirayama, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/067,136

(22) PCT Filed: Nov. 25, 2016

(86) PCT No.: PCT/JP2016/085051
§ 371 (c)(1),
(2) Date: Jun. 29, 2018

(87) PCT Pub. No.: WO2017/122434
PCT Pub. Date: Jul. 20, 2017

(65) Prior Publication Data
US 2019/0022749 A1    Jan. 24, 2019

(30) Foreign Application Priority Data

Jan. 15, 2016  (JP) ................................. 2016-006417
Sep. 28, 2016  (JP) ................................. 2016-190138

(51) Int. Cl.
| B22F 1/00 | (2006.01) |
| B22F 1/02 | (2006.01) |
| C10M 103/02 | (2006.01) |
| C10M 107/44 | (2006.01) |
| C10M 111/04 | (2006.01) |
| C22C 38/00 | (2006.01) |
| C10M 169/04 | (2006.01) |
| B22F 3/02 | (2006.01) |
| C22C 33/02 | (2006.01) |
| B22F 9/08 | (2006.01) |

(52) U.S. Cl.
CPC .............. *B22F 1/0062* (2013.01); *B22F 1/02* (2013.01); *C10M 103/02* (2013.01); *C10M 107/44* (2013.01); *C10M 111/04* (2013.01); *C10M 169/04* (2013.01); *C22C 38/00* (2013.01); *B22F 1/0007* (2013.01); *B22F 3/02* (2013.01); *B22F 9/082* (2013.01); *B22F 2301/35* (2013.01); *B22F 2998/10* (2013.01); *B22F 2999/00* (2013.01); *C10M 2201/041* (2013.01); *C10M 2201/0413* (2013.01); *C10M 2201/05* (2013.01); *C10M 2201/053* (2013.01); *C10M 2217/044* (2013.01); *C10M 2217/0443* (2013.01); *C10N 2220/082* (2013.01); *C10N 2240/40* (2013.01); *C10N 2250/08* (2013.01); *C22C 33/02* (2013.01)

(58) Field of Classification Search
None
See application file for complete search history.

(56) References Cited

U.S. PATENT DOCUMENTS

| 5,368,630 | A | 11/1994 | Luk | |
| 5,744,433 | A * | 4/1998 | Storstrom | B22F 1/0059 419/31 |
| 6,355,208 | B1 * | 3/2002 | Unami | B22F 3/02 419/11 |
| 6,511,945 | B1 | 1/2003 | Ramstedt | |
| 8,187,394 | B2 | 5/2012 | Ye et al. | |
| 8,747,516 | B2 | 6/2014 | Ono et al. | |
| 2003/0127157 | A1 | 7/2003 | Aisin | |
| 2006/0116443 | A1 | 6/2006 | Probst et al. | |
| 2008/0202651 | A1 * | 8/2008 | Uenosono | B22F 3/16 148/579 |
| 2009/0041608 | A1 * | 2/2009 | Ozaki | B22F 1/0003 419/10 |
| 2010/0154588 | A1 * | 6/2010 | Berg | C22C 33/0264 75/246 |
| 2012/0286191 | A1 | 11/2012 | Maeda et al. | |
| 2013/0281589 | A1 * | 10/2013 | Thompson | C08L 77/02 524/232 |

FOREIGN PATENT DOCUMENTS

| CN | 1068263 | C | 7/2001 |
| CN | 101680063 | A | 3/2010 |
| CN | 101681709 | A | 3/2010 |
| CN | 101896299 | B | 10/2012 |
| CN | 104245842 | A | 12/2014 |
| JP | H07504715 | A | 5/1995 |
| JP | 2003183702 | A | 7/2003 |
| JP | 2005504863 | A | 2/2005 |
| JP | 3803371 | B2 | 8/2006 |
| JP | 2010529302 | A | 8/2010 |
| JP | 2011241453 | A | 12/2011 |

OTHER PUBLICATIONS

Feb. 21, 2017, International Search Report issued in the International Patent Application No. PCT/JP2016/085051.
Jun. 18, 2019, Office Action issued by the Canadian Intellectual Property Office in the corresponding Canadian Patent Application No. 3,010,706.
Jul. 2, 2019, Office Action issued by the China National Intellectual Property Administration in the corresponding Chinese Patent Application No. 201680077222.0 with English language search report.
Nov. 26, 2019, Office Action issued by the Korean Intellectual Property Office in the corresponding Korean Patent Application No. 10-2018-7018624 with English language concise statement of relevance.

* cited by examiner

*Primary Examiner* — Ronak C Patel
(74) *Attorney, Agent, or Firm* — Kenja IP Law PC

(57) ABSTRACT

A mixed powder for powder metallurgy having excellent green compact strength and ejectability is provided. The mixed powder for powder metallurgy includes an iron-based powder; and a copolymerized polyamide, in an amount of 0.3 to 2.0 parts by mass per 100 parts by mass of the iron-based powder, having a melting point of 80° C. to 116° C.

1 Claim, No Drawings

MIXED POWDER FOR POWDER METALLURGY

TECHNICAL FIELD

The present disclosure relates to a mixed powder for powder metallurgy. In particular, the present disclosure relates to a mixed powder for powder metallurgy that has excellent ejectability and excellent green compact strength when pressed to form a green compact.

BACKGROUND

Powder metallurgy is a technique for manufacturing sintered parts, such as machine parts, by pressing a mixed power that includes an iron-based powder to obtain a green compact and then sintering the green compact. Recent advances in powder metallurgy techniques have allowed sintered parts with complex shapes to be manufactured to a near net shape with high dimensional accuracy. Powder metallurgy techniques are now used to manufacture products in a variety of fields.

The sintered parts may, however, need post processing (such as cutting work) when extremely strict dimensional accuracy is required or when a horizontal hole, undercut, or other such highly complicated shape is required.

However, sintered parts are too strong for post processing and have a high ratio of holes, increasing the cutting resistance and frictional heat. The surface temperature of the cutting tool thus tends to rise, causing the cutting tool to wear easily and have a shorter life. This leads to the problem of an increase in the cutting work cost and an increase in the manufacturing cost of sintered parts.

To address this issue, green machining, whereby the green compact is subjected to cutting work before being sintered, has attracted attention. The green compact before sintering is typically brittle, however, and often has insufficient machinability. In other words, the green compact before sintering cannot withstand the stress that occurs during mounting on a jig for green machining or during cutting work and thus damages easily. Attempts have therefore been made to increase the strength of a green compact so as to withstand green machining.

For example, in a metal powder composition containing an iron-based powder and a lubricant powder, JP 3803371 B2 (PTL 1) proposes using an amide type oligomer with a weight average molecular weight $M_W$ of 2,000 to 20,000 and a melting point peak of 120° C. to 200° C. as the lubricant powder.

CITATION LIST

Patent Literature

PTL 1: JP 3803371 B2

SUMMARY

Technical Problem

According to PTL 1, the green compact becomes stronger by warm molding, whereby the green compact is molded after preheating to a temperature that is 5° C. to 50° C. below the melting point of the amide type oligomer. With typical molding performing at room temperature, however, the green compact strength is still insufficient. A mixed powder for powder metallurgy that can yield excellent green compact strength under typical molding conditions is therefore required.

Mixed powder for powder metallurgy is not only required to have excellent green compact strength but also to have a low ejection force when the green compact is ejected from the press die after green compacting.

In light of these considerations, it would be helpful to provide a mixed powder for powder metallurgy that has excellent green compact strength and ejectability.

Solution to Problem

Primary features of the present disclosure are as follows.
1. A mixed powder for powder metallurgy comprising:
   an iron-based powder; and
   a copolymerized polyamide, in an amount of 0.3 to 2.0 parts by mass per 100 parts by mass of the iron-based powder, having a melting point of 80° C. to 120° C.
2. The mixed powder for powder metallurgy of 1., wherein the iron-based powder is coated by the copolymerized polyamide.
3. The mixed powder for powder metallurgy of 2., further comprising:
   graphite powder, wherein
   the iron-based powder is coated by the copolymerized polyamide and the graphite powder.

Advantageous Effect

The present disclosure can provide a mixed powder for powder metallurgy with excellent green compact strength and ejectability.

DETAILED DESCRIPTION

The present disclosure is described below in detail. A mixed powder for powder metallurgy (mixed powder) according to the present disclosure includes an iron-based powder and a copolymerized polyamide, in an amount of 0.3 to 2 parts by mass per 100 parts by mass of the iron-based powder, having a melting point of 80° C. to 120° C.

[Iron-Based Powder]

No particular limit is placed on the iron-based powder, and either iron powder (i.e., pure iron powder) or alloyed steel powder may be used. Any type of iron powder may be used, such as atomized iron powder or reduced iron powder. Any type of alloyed steel powder may also be used, such as pre-alloyed steel powder obtained by alloying an alloying element in advance during smelting (completely alloyed steel powder), a partial diffusion-alloyed steel powder obtained by partially diffusing and alloying an alloying element in an iron powder, and a hybrid steel powder obtained by further partially diffusing an alloying element in a pre-alloyed steel powder. Here, iron-based powder refers to powder with an Fe content of 50 mass % or higher, and "iron powder" refers to metal powder consisting of Fe and inevitable impurities.

No limit is particularly placed on the alloy components in the alloyed steel powder. For example, one or more of C, Cr, Mn, Ni, Mo, V, Cu, Nb, and the like can be used. In particular, Ni, Mo, Cu, and the like can be added by diffusion bonding. Graphite or the like can be used as C. The content of the alloy components may be any value such that the Fe content in the iron-based powder is 50 mass % or higher.

A total of approximately 3 mass % or less of impurities may be included in the iron-based powder. The contents of representative impurities are preferably as follows in mass %: C (when not included as an alloying element), 0.05% or less; Si, 0.10% or less; Mn (when not included as an alloying element), 0.50% or less; P, 0.03% or less; S, 0.03% or less; 0, 0.50% or less; and N, 0.1% or less.

The average particle size of the iron-based powder is not particularly limited but is preferably 70 μm to 100 μm. Unless otherwise noted, the particle size of the iron-based powder is the value measured by dry sieving in accordance with JIS Z 2510:2004.

The proportion of iron-based powder in the mixed powder for powder metallurgy is not particularly limited but is preferably 80 mass % or greater. No upper limit is placed on the proportion of iron-based powder in the mixed powder for powder metallurgy, since the proportion may be determined in accordance with the intended use of the sintered part. The entire component, other than the copolymerized polyamide, included in the mixed powder for powder metallurgy may be the iron-based powder. When, for example, the mixed powder for powder metallurgy is composed of 100 parts by mass of the iron-based powder and 0.3 parts by mass of the copolymerized polyamide, then the proportion of iron-based powder in the mixed powder for powder metallurgy is approximately 99.7%. Accordingly, the proportion of iron-based powder in the mixed powder for powder metallurgy can be 99.7% or less.

[Copolymerized Polyamide]

Any copolymerized polyamide having a melting point of 80° C. to 120° C., as described below, may be used as the aforementioned copolymerized polyamide. Examples of the monomer constituting the copolymerized polyamide include lactam or aminocarboxylic acid constituting polycaproamide, polydodecanamide, or the like; and salts combining equimolar amounts of dicarboxylic acid and diamine constituting polytetramethylene adipamide, polypentamethylene adipamide, polypentamethylene sebacamide, polyhexamethylene adipamide, polyhexamethylene sebacamide, polyhexamethylene dodecanamide, or the like. As the monomer, ε-caprolactam constituting polycaproamide, hexamethylene diammonium adipate (AH salt) constituting polyhexamethylene adipamide, hexamethylene diammonium sebacate (SH salt) constituting polyhexamethylene sebacamide, and ω-laurolactam constituting polydodecanamide are particularly preferable.

[[Melting Point]]

If the melting point of the copolymerized polyamide is lower than 80° C., the strength of the copolymerized polyamide itself decreases, and sufficient green compact strength cannot be obtained. If the melting point is higher than 120° C., the bonding strength between molecules of the copolymerized polyamide decreases, and sufficient green compact strength cannot be obtained. Accordingly, the melting point of the copolymerized polyamide is to be 80° C. to 120° C.

[[Content]]

If the total content of the copolymerized polyamide in the mixed powder for powder metallurgy is too low, sufficient green compact strength cannot be obtained. The content of the copolymerized polyamide in the mixed powder for powder metallurgy is therefore set to 0.3 parts by mass or higher per 100 parts by mass of the iron-based powder. The content of the copolymerized polyamide is preferably set to 0.5 parts by mass or higher per 100 parts by mass of the iron-based powder. On the other hand, if the content of the copolymerized polyamide is too large, the density of the green compact decreases. The content of the copolymerized polyamide in the mixed powder for powder metallurgy is therefore set to 2.0 parts by mass or lower per 100 parts by mass of the iron-based powder. The content of the copolymerized polyamide is preferably set to 1.0 parts by mass or lower per 100 parts by mass of the iron-based powder.

The mixed powder of the present disclosure includes a copolymerized polyamide, as described above, and therefore direct contact between the iron-based powder and the press die is suppressed when ejecting the pressed green compact from the press die. The copolymerized polyamide itself also has good lubricity. Consequently, the mixed powder according to the present disclosure has excellent ejectability.

Furthermore, since the adhesive force acts between molecules of copolymerized polyamide included in the mixed powder, the bite of the iron-based powder particles is strengthened. Consequently, the green compact obtained by pressing the mixed powder according to the present disclosure has excellent strength even before sintering, and work such as cutting work can be performed without incurring damage.

[[Average Particle Size]]

If the average particle size of the copolymerized polyamide is too large, the density of the mixed powder decreases, and the desired strength might not be obtained. Conversely, if the average particle size is too small, the fluidity might be insufficient. The average particle size of the copolymerized polyamide is therefore preferably 5 μm to 100 μm. If the average particle size of the copolymerized polyamide is within this range, the fluidity of the mixed powder is better, and the machinability of the green compact before sintering improves. Here, the average particle size is the volume average particle size measured using a laser diffraction/scattering particle size distribution meter.

[Coating]

The iron-based powder and the copolymerized polyamide may be present in the mixed powder for powder metallurgy in any state, but the iron-based powder is preferably coated by the copolymerized polyamide. By the iron-based powder being coated by the copolymerized polyamide, the direct contact between the iron-based powder and the press die can be further reduced when ejecting from the press die, and the ejectability can be further improved.

[[Coating Ratio]]

When the iron-based powder is coated by copolymerized polyamide, the coating ratio of the copolymerized polyamide is preferably 40% or higher, more preferably 60% or higher, to increase the effect of coating with the copolymerized polyamide. Since a higher coating ratio is better, the upper limit is not particularly limited and may be 100%. However, since too much copolymerized polyamide may be added upon excessively increasing the coating ratio, the coating ratio may be 90% or lower or may be 80% or lower. The coating ratio can be adjusted by controlling the added amount of copolymerized polyamide. The coating ratio can also be adjusted by controlling conditions such as the mixing temperature and the stirring speed when mixing the iron-based powder and the copolymerized polyamide.

Here, the coating ratio refers to the ratio (%) of the area of the portion coated by the adhered copolymerized polyamide in the particles constituting the iron-based powder to the total area of the particles when observing the iron-based powder with a scanning electron microscope (SEM).

When measuring the coating ratio, the contrast for identifying the iron-based powder and the copolymerized polyamide can be clearly obtained by setting the accelerating voltage of the SEM to 0.1 kV to 5 kV. Images captured under these optimized measurement conditions are input to a computer as digital data. The data is then binarized using image analysis software, and the coating ratio is calculated by analyzing the area of the particles constituting the iron-based powder and the area of the portion of the particles coated by the adhered copolymerized polyamide. In the present embodiment, the average of the coating ratio of 10 randomly selected particles is used as the coating ratio.

In the case of additionally using graphite powder as described below, the graphite powder and the copolymerized polyamide are observed at a similar contrast during the SEM image observation, making it difficult to separate the area of the two. Accordingly, when using graphite powder, the ratio of the area of the portion covered by at least one of copolymerized polyamide and graphite powder to the area of the particles constituting the iron-based powder can be used as the coating ratio.

[Graphite Powder]

The mixed powder for powder metallurgy in an embodiment of the present disclosure can further contain graphite powder. When using graphite powder, the iron-based powder is preferably coated by the copolymerized polyamide and the graphite powder. By including both copolymerized polyamide and graphite powder and having these coat the iron-based powder, the direct contact between the iron-based powder and the press die can be further reduced when ejecting from the press die, and the ejectability can be further improved.

[Metal-Containing Powder for Alloys]

Any metal-containing powder for alloys, such as a metal powder or a metal compound powder, may be used as the metal-containing powder for alloys. Examples of the metal powder include nonferrous metal powder such as Cu powder, Mo powder, and Ni powder. Examples of the metal compound powder include metal oxide powder, such as copper oxide powder. One or more types of the metal-containing powder for alloys can be used in accordance with the desired sintered body characteristics. The strength of the resulting sintered body can be improved by adding the metal-containing powder for alloys.

The mix proportion of the metal-containing powder for alloys is not particularly limited and may be determined in accordance with the desired sintered body strength. To sufficiently obtain the effect of adding the mixed powder for powder metallurgy, the content of the metal-containing powder for alloys relative to the entire mixed powder for powder metallurgy is preferably 0.1 mass % or higher and more preferably 1 mass % or higher. However, if the amount of the metal-containing powder for alloys is excessive, the dimensional accuracy of the sintered body may decrease. The content of the metal-containing powder for alloys relative to the entire mixed powder for powder metallurgy is therefore preferably 10 mass % or lower and more preferably 5 mass % or lower.

[Additive]

The mixed powder according to the present disclosure can, as necessary, contain any additives. A lubricant, for example, may be contained as an additive. Examples of the lubricant include metal soaps, such as zinc stearate; fatty acid amides; and polyethylene. The proportion of the additive in the mixed powder for powder metallurgy is not particularly limited but is preferably 2.0 parts by mass or less per 100 parts by mass of the iron-based powder.

[Manufacturing Method]

The mixed powder according to the present disclosure may be manufactured with any method. In one embodiment, the mixed powder for powder metallurgy can be obtained by appropriately mixing the iron-based powder, the copolymerized polyamide, any graphite powder, and any additives with a mixer. The mixing may be performed once or performed two or more times.

For example, the copolymerized polyamide, any metal-containing powder for alloys, and other additives may be added to the iron-based powder and mixed. At the time of the mixing, the mixture is stirred while being heated to or above the melting point of the copolymerized polyamide and is then gradually cooled while stirring, so that the surface of the iron-based powder is coated by melted copolymerized polyamide, and furthermore so that the metal-containing powder for alloys and other additives are stuck to the iron-based powder. Other additives may be further mixed into the resulting mixed powder as necessary. In this case, the other additives do not stick to the iron-based powder but rather exist in a free state.

The mixing means is not particularly limited, and any of a variety of known mixers or the like may be used, but for ease of heating, a high-speed bottom stirring mixer, an inclined rotating pan-type mixer, a rotating hoe-type mixer, or a conical planetary screw-type mixer is preferably used.

The temperature during the mixing (mixing temperature) is preferably from (melting point of copolymerized polyamide being used+20° C.) to (melting point of copolymerized polyamide being used+70° C.).

[Method of Use]

The mixed powder for powder metallurgy can be used as the raw material for powder metallurgy. In other words, by pressing the mixed powder according to the present disclosure by any method to yield a green compact and then sintering the green compact, sintered parts such as machine parts can be manufactured. The sintering can, for example, be performed between 1000° C. and 1300° C. The green compact obtained by pressing the mixed powder of the present disclosure has excellent strength and can therefore be subjected, even before sintering, to work such as cutting (green machining) while suppressing damage.

EXAMPLES

Although the present disclosure will be described below in further detail with reference to Examples, the present disclosure is not intended to be limited in any way to the following Examples.

The mixed powder for powder metallurgy was manufactured by the following procedure. First, copolymerized polyamide particles (average particle size 40 μm) or ethylene bis stearamide (EBS) were added as a lubricant to iron powder (atomized iron powder 301A produced by JFE steel corporation), copper powder: 2 mass %, and graphite powder: 0.8 mass %, and after heating to a predetermined temperature while stirring with a high-speed bottom stirring mixer, the mixed powder was discharged from the mixer. The melting point and added amount of the lubricant and the mixing temperature are listed in Table 1. Next, each of the resulting mixed powders for powder metallurgy was used to prepare a green compact, and the green density, ejection force, and green compact strength were measured. The measurement results are listed in Table 1. The measurement method at that time was as follows.

[Green Compact Strength]

As the green compact strength, the transverse rupture strength was measured with the following procedure. The transverse rupture strength is a numerical index for cracks occurring during drilling. The measurement was made in accordance with the Japan Powder Metallurgy Association standard JPMA P10-1992, and the transverse rupture strength (units: MPa) of the green compact formed by a forming pressure of 690 MPa was measured. As the measured value of the transverse rupture strength is greater, the increase in strength of the green compact is greater, and the green compact before sintering can be considered to have better machinability.

[Green Density, Ejection Force]

When forming during the measurement of the green compact strength, the density (units: g/cm$^3$) and ejection force (units: MPa) of the resulting green compact were measured. A lower value for the ejection force indicates better ejectability.

As is clear from the results in Table 1, the green compact produced using the mixed powder for powder metallurgy that satisfies the conditions of the present disclosure has excellent ejectability and excellent transverse rupture strength. The green compact can therefore be subjected, even before sintering, to work such as cutting (green machining) while suppressing damage.

[Coating Ratio]

Furthermore, the coating ratio of the mixed powder for powder metallurgy in Example Nos. 2, 4, 5, 6, and 7 was evaluated with the above-described method. At this time, the accelerating voltage at the time of observation with a SEM was set to 1.5 kV. The evaluation results are shown in Table 2.

As is clear from the results in Table 2, sample No. 4 with a low coating ratio had low green density, low green compact strength, and high ejectability. Samples with a higher coating ratio had both excellent ejectability and excellent transverse rupture strength.

TABLE 1

| | Iron-based powder | | Powder for alloys | Graphite powder Graphite | Lubricant | | |
|---|---|---|---|---|---|---|---|
| No | Type | Content[*1] (mass %) | Cu powder[*1] (mass %) | powder[*1] (mass %) | Type | Melting point (° C.) | Added amount[*1] (parts by mass) |
| 1 | 301A | 97.2 | 2 | 0.80 | copolymerized polyamide | 90 | 0.6 |
| 2 | 301A | 97.2 | 2 | 0.80 | copolymerized polyamide | 116 | 0.6 |
| 3 | 301A | 97.2 | 2 | 0.80 | copolymerized polyamide | <u>142</u> | 0.6 |
| 4 | 301A | 97.2 | 2 | 0.80 | copolymerized polyamide | 116 | 0.6 |
| 5 | 301A | 97.2 | 2 | 0.80 | copolymerized polyamide | 116 | 0.6 |
| 6 | 301A | 97.2 | 2 | 0.80 | copolymerized polyamide | 116 | 0.6 |
| 7 | 301A | 97.2 | 2 | 0.80 | copolymerized polyamide | 116 | 0.6 |
| 8 | 301A | 97.2 | 2 | 0.80 | copolymerized polyamide | 116 | 0.2 |
| 9 | 301A | 97.2 | 2 | 0.80 | copolymerized polyamide | 116 | 0.3 |
| 10 | 301A | 97.2 | 2 | 0.80 | copolymerized polyamide | 116 | 0.4 |
| 11 | 301A | 97.2 | 2 | 0.80 | copolymerized polyamide | 116 | 0.8 |
| 12 | 301A | 97.2 | 2 | 0.80 | copolymerized polyamide | 116 | 1.2 |
| 13 | 301A | 97.2 | 2 | 0.80 | copolymerized polyamide | 116 | 2.2 |
| 14 | 301A | 97.2 | 2 | 0.80 | copolymerized polyamide | 65 | 0.6 |
| 15 | 301A | 97.2 | 2 | 0.80 | EBS | 145 | 0.8 |
| 16 | 301A | 99.2 | 0 | 0.80 | copolymerized polyamide | 116 | 0.6 |

| | Lubricant | | Measurement results | | | |
|---|---|---|---|---|---|---|
| No | Added amount[*2] (parts by mass) | Mixing temperature (° C.) | Green density (g/cm$^3$) | Green compact strength (MPa) | Ejection force (MPa) | Notes |
| 1 | 0.62 | 125 | 7.04 | 20.9 | 13.8 | Example |
| 2 | 0.62 | 150 | 7.03 | 25.2 | 16.9 | Example |
| 3 | 0.62 | 170 | 7.08 | 14.6 | 22.8 | Comparative Example |
| 4 | 0.62 | 100 | 6.99 | 19.0 | 19.1 | Example |
| 5 | 0.62 | 125 | 7.01 | 20.1 | 17.9 | Example |
| 6 | 0.62 | 175 | 7.04 | 28.0 | 15.8 | Example |
| 7 | 0.62 | 190 | 7.07 | 25.1 | 14.6 | Example |
| 8 | <u>0.21</u> | 150 | 7.16 | 15.2 | 15.5 | Comparative Example |
| 9 | 0.31 | 150 | 7.13 | 17.0 | 15.2 | Example |
| 10 | 0.41 | 150 | 7.10 | 19.1 | 15.0 | Example |
| 11 | 0.82 | 150 | 6.99 | 25.3 | 14.3 | Example |
| 12 | 1.23 | 150 | 6.86 | 20.3 | 11.5 | Example |
| 13 | <u>2.26</u> | 150 | 6.60 | 16.5 | 10.2 | Comparative Example |
| 14 | 0.62 | 125 | 7.05 | 18.4 | 12.6 | Comparative Example |
| 15 | 0.82 | 150 | 7.15 | 12.5 | 17.2 | Comparative Example |
| 16 | 0.60 | 150 | 7.02 | 24.8 | 16.5 | Example |

[*1]Ratio relative to the total amount of iron-based powder, powder for alloys, and graphite powder
[*2]Value converted to an amount relative to 100 parts by mass of iron-based powder

TABLE 2

| No. | Mixing temperature (° C.) | Coating ratio (%) | Green density (g/cm$^3$) | Green compact strength (MPa) | Ejection force (MPa) |
|---|---|---|---|---|---|
| 4 | 100 | 23 | 6.99 | 19.0 | 19.1 |
| 5 | 125 | 48 | 7.01 | 20.1 | 17.9 |
| 2 | 150 | 65 | 7.03 | 25.2 | 16.9 |
| 6 | 175 | 69 | 7.04 | 28.0 | 15.8 |
| 7 | 190 | 72 | 7.07 | 25.1 | 14.6 |

The invention claimed is:

1. A mixed powder for powder metallurgy comprising: an iron-based powder; and a copolymerized polyamide, in an amount of 0.3 to 2.0 parts by mass per 100 parts by mass of the iron-based powder, having a melting point of 80° C. to 116° C.; and graphite powder, wherein the iron-based powder is coated by the copolymerized polyamide and the graphite powder, and an average particle size of the iron-based powder is 70 μm to 100 μm.

* * * * *